Figure 1:
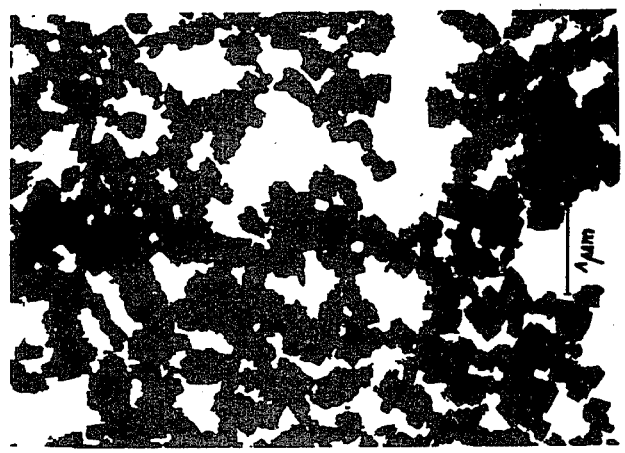

United States Patent [19]

Brunn et al.

[11] 4,358,431
[45] Nov. 9, 1982

[54] PRODUCTION OF MAGNETIC IRON OXIDES

[75] Inventors: Horst Brunn; Peter Kiemle; Franz Hund; Heribert Bade, all of Krefeld, Fed. Rep. of Germany

[73] Assignee: Bayer Aktiengesellschaft, Leverkusen, Fed. Rep. of Germany

[21] Appl. No.: 286,134

[22] Filed: Jul. 23, 1981

[30] Foreign Application Priority Data

Jul. 29, 1980 [DE] Fed. Rep. of Germany ....... 3028679

[51] Int. Cl.$^3$ ............................................. C01G 49/08
[52] U.S. Cl. ................... 423/632; 106/304; 423/633; 423/634
[58] Field of Search .................. 423/632, 633, 634; 106/304; 252/62.56

[56] References Cited

U.S. PATENT DOCUMENTS 3,015,627 1/1962 Ayers et al. ...................... 423/634
4,234,348 11/1980 Brunn et al. ................... 423/634 X

FOREIGN PATENT DOCUMENTS 2414805 10/1975 Fed. Rep. of Germany ...... 106/304
2753009 7/1978 Fed. Rep. of Germany ...... 423/632

Primary Examiner—Jack Cooper
Attorney, Agent, or Firm—Sprung, Horn, Kramer & Woods

[57] ABSTRACT

In the production of needle-shaped magnetic iron oxide pigments by treating iron with a nitro-aromatic in the presence of $\alpha$-FeOOH nuclei to form $\alpha$-FeOOH particles and an amino-aromatic, and thereafter dehydrating the $\alpha$-FeOOH particles and reducing them, the improvement which comprises forming the $\alpha$-FeOOH nuclei at about 0° to 90° C. in a suspension of metallic iron, an iron-(II)-salt and a nitro-aromatic by adding a basic precipitant in about 10 to 95% of the amount required for the complete precipitation of the iron in the iron-(II)-salt. Advantageously the metallic iron comprises cast iron, the nitro-aromatic comprises nitrobenzene, the amino-aromatic comprises aniline, the basic precipitant comprises at least one of ammonia and a basically reacting alkali metal, alkaline earth metal or ammonium salt, the nuclei formation is carried out at about 10° to 60° C., and the basic precipitant is added in about 20 to 80% of the amount required for the complete precipitation of the iron in the iron-(II)-salt, additional iron and nitrobenzene being added to the suspension of precipitated nuclei to form the $\alpha$-FeOOH particles.

7 Claims, 3 Drawing Figures

PRODUCTION OF MAGNETIC IRON OXIDES

This invention relates to a process for the production of needle-shaped magnetic iron oxides from needle-shaped α-FeOOH-pigments which are produced by oxidation of iron with nitro aromatics and to the use thereof.

Processes have been known for a long time which describe the production of needle-shaped magnetic iron oxides from needle-shaped α-FeOOH (U.S. Pat. No. 2,694,656). In these processes, the starting material α-FeOOH is produced in an aqueous iron-(II)-salt solution with separately produced α-FeOOH-nuclei by air oxidation either from precipitated iron-(II)-hydroxide (precipitation process) or from metallic iron (Penniman process) (German Offenlegungsschrift No. 1,592,398, German Auslegeschrift No. 1,242,199, German Pat. No. 1,176,111). The disadvantage of these processes are the salts produced in the precipitation process and the small space/time yield in the Penniman process.

Processes for the production of iron oxide or iron oxide hydroxides suitable as coloring pigments by oxidizing iron with nitro aromatics, specifically nitrobenzene, in acid electrolyte solutions (referred to in the following as the "nitrobenzene process") are very economical. In embodiments of the nitrobenzene process used commercially hitherto for the production of α-FeOOH, the required phase and the pigment characteristics of the product are controlled by the addition of $AlCl_3$ (German Pat. No. 515,758), hydrolyzable 3- and 4-valent metal salts (German Patent No. 516,999) and $AlCl_3$ and tin salts (German Pat. No. 703,416).

The α-FeOOH pigments produced hitherto according to the embodiments of the nitrobenzene process are, however, not very suitable as starting materials for the production of magnetic iron oxides.

The magnetic values of the needle-shaped magnetic iron oxides produced from α-FeOOH are considerably impaired by the foreign ion-supplementary electrolytes described, because the foreign metal ions added are incorporated in the lattice of α-FeOOH and are still contained after conversion as a magnetic dilution in the oxidic magnetic pigment in addition to the iron ions which provide magnetism.

It is impossible with the processes known hitherto to intervene to control the formation of nuclei. However, it is necessary, in order to obtain optimum and variable magnetic characteristics of the magnetic pigments, to produce α-FeOOH-starting materials with defined particle shape and particle size. This is only possible by using nuclei in the pigment formation. α-FeOOH pigments for the area of use of magnetic storage materials with low-noise characteristics or for improved computer tapes are in the crystallite size range of between 26 and 31 nm.

Therefore, an object of the invention is to develop a process which allows needle-shaped α-FeOOH pigments with crystallite sizes of from 26 to 31 nm with exactly defined characteristics to be produced economically according to the nitrobenzene process, which pigments may be converted into needle-shaped magnetic iron oxides ($Fe_3O_4$, $\gamma$-$Fe_2O_3$ or $Fe_3O_4$-$\gamma$-$Fe_2O_3$-mixed phases).

Surprisingly, it has now been found that with the presence of iron and nitrobenzene in the starting solution during the $Fe(OH)_2$-precipitation from iron-(II)-salt by alkali metal hydroxides or alkali metal carbonates, the formation of such finely particulate α-FeOOH-nuclei may be achieved, and that during the subsequent pigment growth, α-FeOOH-pigments in the crystallite size range of up to 36 nm, preferably from 26 to 31 nm, are produced in an economic manner. As a result of this, it is possible to produce correspondingly fine-particled α-FeOOH-pigments with a good space/time-yield. The crystallite size may naturally be increased to any extent by an increased addition of the nitro aromatic compound and iron reactants.

Thus, the present invention provides a process for the production of needle-shaped magnetic iron oxide pigments, according to the aniline process, from needle-shaped α-FeOOH-nuclei, by subsequent dehydration, reduction and optionally oxidation, wherein the α-FeOOH-nuclei are formed at temperatures of about 0° to 90° C. in a suspension of metallic iron, iron-(II)-salts and nitro aromatics by adding about 10 to 95% of the quantity of basic precipitants required for the complete precipitation of the iron-(II)-salts.

In this process, impure cast iron chips may be used as metallic iron, without thereby impairing the quality of the particles obtained. Nitrobenzene proves to be a particularly preferred aromatic nitro compound.

A part of the cast iron required for the total reaction and about 5 to 50% of the nitrobenzene required for the total reaction are added to an aqueous Fe-(II)-salt solution. Iron-(II)-hydroxide or basic iron-(II)-salt is precipitated with intensive stirring from this reaction mixture with a quantity of basic precipitant such that the precipitation corresponds to from 0.10 to 0.95 times the predetermined iron-(II)-salt.

Particularly good results are obtained with a precipitation degree of about 20 to 80%.

Ammonia and/or basic alkali metal salts, alkaline earth metal salts and/or ammonium salts are particularly suitable as basic precipitants.

During this reaction, the temperature is set in the range of about 0° to 90° C., a particularly preferred range being about 10° to 60° C., and the reaction mixture is stirred for about 0.3 to 2 hours. The mixture is then heated to about 90° to 98° C. during about 15 minutes to 2 hours and is stirred again for about 15 minutes to 2 hours. The nuclei formation is then completed. After adding more Fe-(II)-salt solution, the finely particulate nucleus suspension obtained is then mixed with the remaining iron and the rest of the aromatic nitro compound at about 90° to 100° C. for about 1 to 10 hours. The total quantity of iron and of aromatic nitro compound added depends on the nucleus crystallite size and the required final crystallite size of the needle-shaped α-FeOOH-pigments. For this reason, the excess of aromatic nitro compound used for example in the nuclei formation and the quantity of iron presented there have to be considered. The reaction takes place at about 90° to 100° C. and the reaction mixture is stirred for about 2 to 20 hours at these temperatures. The aromatic amino compound formed is separated by steam distillation and the pigment is then washed, filtered and dried.

Iron-(II)-sulphate (about 50 to 500 g/l), iron-(II)-chloride, other soluble iron-(II)-salts or mixtures of different soluble Fe-(II)-salts may be used as the iron-(II)-salts. Alkali or alkaline earth metal hydroxides and/or alkaline earth metal carbonates, ammonia or organic amino compounds are suitable as a basic precipitant. Soda lye is preferably used. The aromatic nitro compound is preferably nitrobenzene. In contrast to the processes known hitherto which work substantially with iron-(II)- or aluminum chloride, the process according to the invention may also start from iron-(II)-sulphate. Moreover, in the process described here, cheap, impure and reaction-active, so-called cast iron may be used without thereby impairing the needle shaped of the particles. In the processes previously described, expensive pure iron which is slow to react was required for the production of needle-shaped particles.

FIG. 1 illustrates an electron microscopic photograph of an $\alpha$-FeOOH-pigment which was produced according to a known process using $AlCl_3$ and impure reaction-active cast iron. The needle or prism shape of the particles is difficult to discern.

Figure 2:

In FIG. 2, the prism shape which is substantially improved compared to FIG. 1 may be seen, in the production of an $\alpha$-FeOOH-pigment according to the same process, i.e. using $AlCl_3$, but using pure, expensive iron which is slow to react.

Figure 3:

In contrast thereto, FIG. 3 illustrates an $\alpha$-FeOOH-pigment produced using impure, cheap cast iron according to the process of the invention without foreign ion additives. The distinctly pronounced needles of small particle size may be clearly seen.

The markedly needle-shaped $\alpha$-FeOOH-pigments, obtained according to the new process described, are dehydrated into $\alpha$-Fe$_2$O$_3$ in conventional manner while retaining the needle shape (Pseudomorphosis), by heating to temperatures above 200° C., are reduced to Fe$_3$O$_4$ at temperatures above 300° C. with hydrogen containing steam and then optionally reoxidized into Fe$_3$O$_4$-$\gamma$-Fe$_2$O$_3$-mixed phase or into $\gamma$-Fe$_2$O$_3$-magnetic pigment at approximately 300° C.

These pigments may be used for the production of magnetic recording supports.

The process according to the invention is described in the following by way of example.

Example 1

10.21 l of FeSO$_4$(240 g/l), 1.021 l of FeCl$_2$ (360 g/l), 1.21 kg of cast iron and 1,361 l of nitrobenzene are introduced into a 90 liter reaction vessel with a reflux cooler, a stirrer and devices for controlling the temperature and measuring the pH, are tempered to 30° C., stirred for 10 minutes with 5.433 l (190 g/l) of NaOH, heated to 90° C. in 60 minutes, and then stirred again for 15 minutes. The nuclei formation is thereby completed.

The suspension is then rapidly mixed with 1.0 l of FeCl$_2$ (360 g/l) and heated to 98° C. 9 batches each comprising 447 g of cast iron scrap are added at 10 minute intervals and 3,489 l of nitrobenzene are then added during the course of 2 hours. 30 minutes after the nitrobenzene has been added, 5 batches each comprising 500 ml of water are added at 30 minute intervals. The total running time is 6 hours. The temperature is maintained at 98° C. during the total reaction. The aniline formed is separated by steam distillation, excess iron is sieved off, and the yellow pigment is washed, filtered and dried at 140° C. The crystalline size of the $\alpha$-FeOOH determined according to the X-ray method is 28.5 $\mu$m.

Conversion into $\gamma$-Fe$_2$O$_3$

The needle-shaped $\alpha$-FeOOH formed is dehydrated at 400° C. for 60 minutes in a muffle furnace. The needle-shaped $\alpha$-Fe$_2$O$_3$ obtained thereby is reduced to Fe$_3$O$_4$ with hydrogen charged with steam in a fluidized bed for 15 minutes at 460° C. and for 45 minutes at 520° C. and is then reoxidized with air for 45 minutes at 280° C. A $\gamma$-Fe$_2$O$_3$ magnetic pigment is obtained with the following characteristics:

| | |
|---|---|
| Coercive force (powder): | 1 $H_C$ powder = 432 (Oe) |
| Coercive force (tape): | 1 $H_C$ tape = 351 (Oe) |
| Remanence: | $B_r/\rho$ = 466 (Gauss. cm$^3$.g$^{-1}$) |
| Orientability: | $B_r/B_s$ = 0.89 |

Volume filling factor VF=35.6% (in the conventional tape incorporation).

Comparative Example 10.2 l of FeSO$_4$-solution (240 g/l) are introduced into a 90 liter reaction vessel with a reflux cooler, a stirrer and devices for controlling the temperature and measuring the pH and are mixed with 5.4 l of NaOH-solution (190 g/l) at room temperature (30° C.) in the course of 10 minutes. 2.0 l of FeCl$_2$-solution (360 g/l) and 860 ml of nitrobenzene are then added and the suspension is then restirred for 10 minutes. The nuclei formation takes place with stirring and electronic heating to 90° C. in the course of 60 minutes. When the temperature of 90° C. has been reached, 4.0 l of nitrobenzene are metered in for 2 hours and 5 kg of cast iron are added in the course of 4 hours. For 3 hours after the completion of the nuclei formation, 800 ml of water are also added each every 30 minutes. The total running time is 6 hours. Processing takes place in the same manner as in Example 1.

The crystallite size of the $\alpha$-FeOOH thus obtained is 41 $\mu$m. The conversion is carried out as in Example (1B). A $\gamma$-Fe$_2$O$_3$-magnetic pigment is obtained with the following characteristics:

| | |
|---|---|
| Coercive force (powder): | 1 $H_C$ powder = 372 (Oe) |
| Coercive force (tape): | 1 $H_C$ tape = 325 (Oe) |
| Remanence: | $B_r/\rho$ = 435 (Gauss. cm$^3$.g$^{-1}$) |
| Orientability: | $BR/B_s$ = 0.82 |

Volume filling factor VT=32.0% (in the conventional tape incorporation).

It will be understood that the specification and examples are illustrative but not limitative of the present invention and that other embodiments within the spirit and scope of the invention will suggest themselves to those skilled in the art.

We claim:

1. In the production of needle-shaped magnetic iron oxide pigments by treating iron with a nitro-aromatic in the presence of $\alpha$-FeOOH nuclei to form $\alpha$-FeOOH particles and an amino-aromatic, and thereafter dehydrating the $\alpha$-FeOOH particles and reducing them, the improvement which comprises forming the $\alpha$-FeOOH nuclei at about 0° to 90° C. in a suspension of metallic iron, an iron-(II)-salt and a nitro-aromatic by adding as a basic precipitant alkali or alkaline earth metal hydroxides and/or alkaline earth metal carbonates, ammonia or organic amino compounds in about 10 to 95% of the amount required for the complete precipitation of the iron in the iron-(II)-salt as Fe(OH)$_2$ or a basic Fe(II) salt.

2. A process according to claim 1, wherein the basic precipitant is added in about 20 to 80% of the amount required for the complete precipitation of the iron in the iron-(II)-salt.

3. A process according to claim 1, wherein the nuclei formation is carried out at about 10° to 60° C.

4. A process according to claim 1, wherein the metallic iron comprises cast iron.

5. A process according to claim 1, wherein the nitro-aromatic comprises nitrobenzene and the amino-aromatic comprises aniline.

6. A process according to claim 1, wherein to the suspension of precipitated nuclei additional iron and nitro-aromatic are added to form the α-FeOOH particles.

7. A process according to claim 6, wherein the metallic iron comprises cast iron, the nitro-aromatic comprises nitrobenzene, the amino-aromatic comprises aniline, the nuclei formation is carried out at about 10° to 60° C., and the basic precipitant is added in about 20 to 80% of the amount required for the complete precipitation of the iron in the iron-(II)-salt.

* * * * *